United States Patent [19]
Mix et al.

[11] Patent Number: 5,455,487
[45] Date of Patent: Oct. 3, 1995

[54] MOVEABLE DESKTOP LIGHT CONTROLLER

[75] Inventors: Jerome M. Mix, Redwood City; Charles C. Hu, Saratoga; James C. Sprout, Los Altos, all of Calif.

[73] Assignee: The Watt Stopper, Santa Clara, Calif.

[21] Appl. No.: 125,989

[22] Filed: Sep. 22, 1993

[51] Int. Cl.⁶ .................................................. H05B 37/02
[52] U.S. Cl. ........................ 315/150; 315/159; 315/307; 315/153; 340/825.72
[58] Field of Search .................................. 315/150, 159, 315/291, 307, 153, 156; 455/66, 70; 340/825.06, 825.72; 250/221; 359/142, 147

[56] References Cited

U.S. PATENT DOCUMENTS

| | | | |
|---|---|---|---|
| 4,727,393 | 2/1988 | Goldstein | 359/142 |
| 4,818,973 | 4/1989 | Yamakawa et al. | 340/554 |
| 5,099,193 | 3/1992 | Moseley et al. | 315/291 |
| 5,220,250 | 6/1993 | Szuba | 315/156 |
| 5,293,097 | 3/1994 | Elwell | 315/159 |

FOREIGN PATENT DOCUMENTS

| | | | |
|---|---|---|---|
| 2183377 | 6/1987 | European Pat. Off. | 359/147 |

*Primary Examiner*—Robert J. Pascal
*Assistant Examiner*—Darius Gambino
*Attorney, Agent, or Firm*—Townsend and Townsend and Crew

[57] ABSTRACT

A device for controlling power to an electrical load. The device has two components: a portable desktop detector unit and a wall-mounted receiver unit. The desktop detector detects the presence of a human in a room and the ambient light level and sends signals to the receiver unit to supply power to or withhold power from an electrical load such as a fluorescent light and to adjust the brightness of the light. Since the detector is portable, it can be positioned and repositioned at different locations in a room to maximize its ability to detect the presence of a human and to sense the level of ambient light in various room locations. Each detector and receiver pair have matching addresses so that a receiver will operate an electrical load only in response to its mated detector, thus allowing multiple devices to be used to control multiple lights without interfering with each other. The device can also operate with a third component that acts as a master key and controls the maximum brightness, at which lights may be operated.

32 Claims, 6 Drawing Sheets

MOVEABLE DESKTOP LIGHT CONTROLLER

BACKGROUND OF THE INVENTION

The present invention relates to a device that controls power to an electric load. More specifically, the present invention relates to sensors for detecting the presence of a person and the level of ambient light in an area and activating and controlling lights or other apparatus accordingly.

There are a variety of sensors on the market that detect the presence of a person in a room for the purpose of automatically turning lights ON and OFF. Most often these sensors detect a person's presence by detecting either movements of the person or his or her body heat. Movement is commonly detected by using an ultrasonic transmitter and receiver that are mounted at a position in a room that is most likely to detect movement. The ultrasonic transmitter transmits an ultrasonic signal that reflects off objects in the room and is detected by the ultrasonic receiver. An examination of the frequency of the received waves can be used to detect movement by the Doppler effect. Because of the ability of ultrasonic waves to bounce off objects, ultrasonic motion detectors can suffer from the disadvantage that movement which occurs outside of a room or desired area can be detected by the sensors. Thus, ultrasonic motion detectors have a tendency to switch lights ON when the lights are not actually needed.

Another method of detecting the presence of people is by using an infrared sensor that detects the heat given off by a person in the room. Such infrared sensors detect a rapid change in heat, such as when a person enters a room, and are mounted at a position in the room in which they are likely to detect a person. Because infrared sensors only detect rapid changes in heat, they often correctly distinguish between slow and constant heat increases brought on by a device such as a heating element, computer, or coffee maker in the vicinity of the sensor. However, when heat sources that rapidly change temperature such as tungsten lamps are present, infrared sensors often falsely indicate the presence of a person. Additionally, infrared sensors may not be able to detect a person who is not in the immediate vicinity of the sensor or is blocked by a chair, bookcase, or other object.

The level of sensitivity of infrared sensors is typically adjustable. However, adjusting a sensor so that it is more likely to detect a person at a distance means the sensor will also be more likely to falsely indicate the presence of a person if some other heat source is present. Accordingly, since prior art sensors only allow for the sensitivity of the sensor to be adjusted, false readings are likely to occur in certain situations.

The above problems of correctly determining the presence of a person are greatly exacerbated if a workroom is large and commonly has only one person working at one of two or more different locations in the room.

There are also sensors on the market that adjust the brightness of lights in a room or turn the lights ON and OFF depending on the level of ambient light detected by the sensor. These sensors are subject to the same difficulties and inefficiencies as the prior art sensors detecting the presence of a person in that they too are mounted in a single position, usually near the lighting source. However, if a person frequently works far from the location of the sensor, lights that are needed in order to perform work tasks may be switched OFF or dimmed by the sensor. Some ambient light sensors are adjustable to turn lights ON and OFF at different levels, but the adjustment mechanism is on the sensor or at a power switching location requiring a person to move each time an adjustment in the sensor's sensitivity is to be made.

SUMMARY OF THE INVENTION

The present invention solves the problems associated with prior art sensors that control power to an electric load by providing a sensor device that consists of two separate components: a portable desktop detector unit and a wall mounted load control unit. The desktop detector detects the presence of a human in a room and the ambient light level and sends wireless signals to the receiver unit to supply power to or withhold power from an electrical load such as a fluorescent light, and to adjust the brightness of the light. Since the detector is portable, it can be positioned and repositioned at different locations in a room to maximize its ability to detect the presence of a person and to sense the level of ambient light in various room locations. The sensor's mobility also makes it ideal for detecting the level of ambient light at the location where a person is present or is working in a room. The wall mounted load control unit receives signals transmitted by the desktop detector unit and controls an electric load accordingly.

Identification addresses can be assigned to both the detector unit and the load control unit so that each detector and load control unit pair have matching addresses, ensuring that a load control unit will operate an electric load only in response to signals transmitted by its mated detector. The identification addresses allow multiple devices to control multiple lights without interfering with each other. The device can also operate in conjunction with a third component, a maintenance unit, that acts as a master key and controls the maximum brightness a user can select for the lights.

In one embodiment of the present invention, a sensor detects whether a room is occupied and generates an indicative control signal. The control signal is then wirelessly transmitted to a switch that switches power to an electric load ON and OFF in response to the control signal.

Another embodiment of the invention provides for a moveable sensing device and a wall- or ceiling-mounted load control unit. The moveable sensing device includes a sensor that detects whether a person is in a room, a timing circuit that detects whether a person leaves the room, a signal generator that generates a control signal to switch an electric load ON and OFF, and a transmitter that transmits the control signal by a wireless transmission method. The mounted control unit includes a signal receiver to receive the wireless transmission of the control signal, and a switch that responds to the control signal to switch power to an electric load ON and OFF.

Another aspect of the invention provides a photo sensor for detecting the ambient light level in a room, a circuit that calculates the output intensity level of a light in response to the level of detected ambient light, and a circuit that adjusts the brightness of a light to the calculated intensity level. Using an input device, one may select a brightness level to which the circuits will adjust the light.

The features and advantages of an electric load controller according to the present invention will be more clearly understood from the following description taken in conjunction with the accompanying drawings.

DETAILED DESCRIPTION OF THE PREFERRED EMBODIMENTS

I. Occupancy Detector

Figure 1:
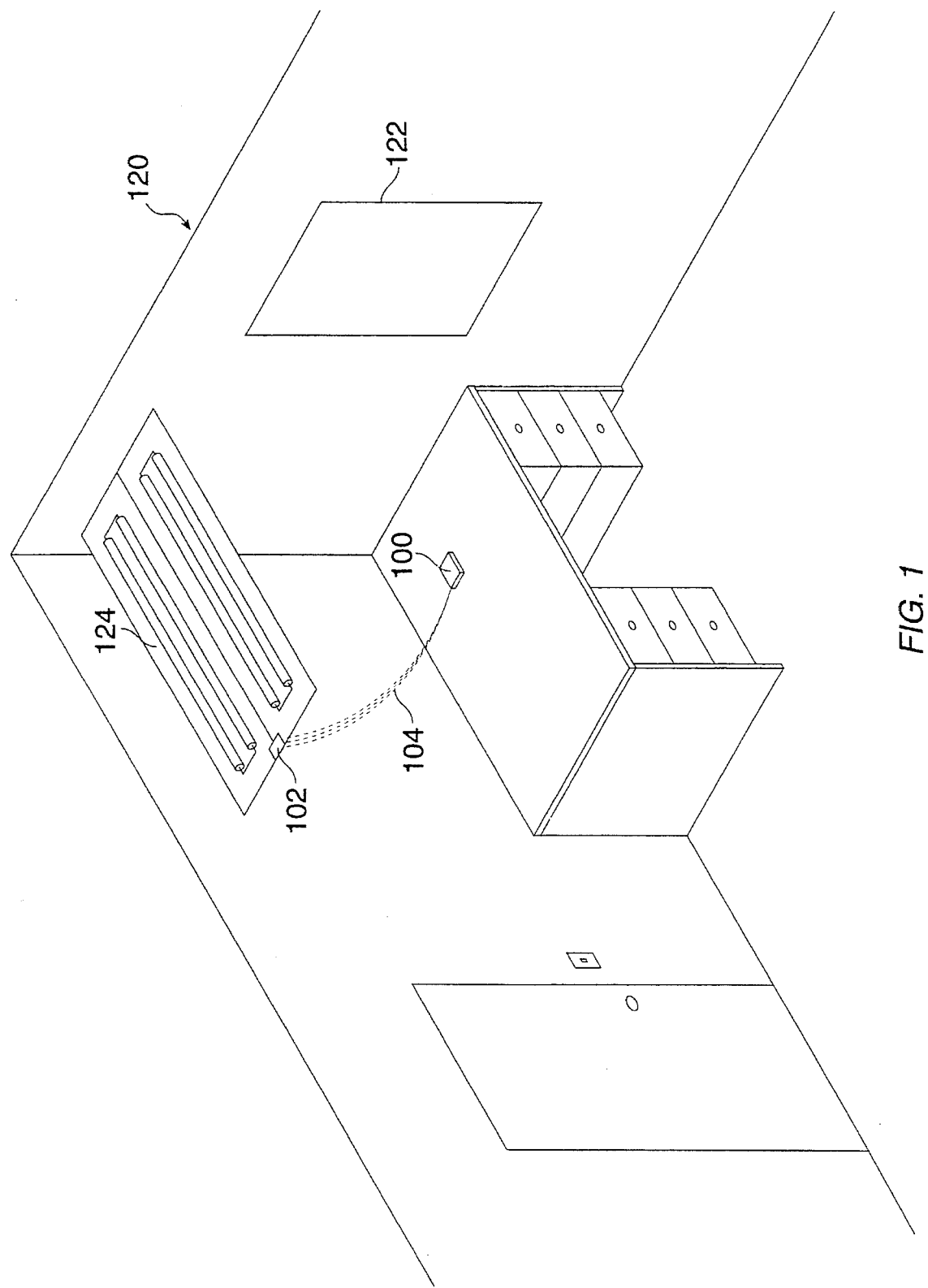
FIG. 1 is a perspective view of the desktop sensor system installed in a room according to one embodiment of the present invention.

FIG. 1 is a perspective view of the desktop sensor system installed in a room according to one embodiment of the present invention. The sensor shown in FIG. 1 includes a portable sensing device 100 and a load control unit 102. Sensing device 100 operates on battery power to detect the presence of a person in a room 120. Sensing device 100 processes the received information and communicates the processed information in the form of control signals 104 to load control unit 102 by a wireless transmission method.

Load control unit 102 receives control signals 104 transmitted by sensing device 100 and switches a light 124 ON or OFF. Typically load control unit 102 is mounted on a wall or ceiling near light 124. Because the sensing device 100 operates on battery power and communicates to load control unit 102 by wireless transmission, it has no wires or electric cords attached to it. Thus, sensing device 100 is completely portable and can be easily moved to any suitable location in a room. Alternately, sensing device 100 could plug into AC power instead of using a battery, but still communicate to load control unit 102 by a wireless method.

Figure 2:
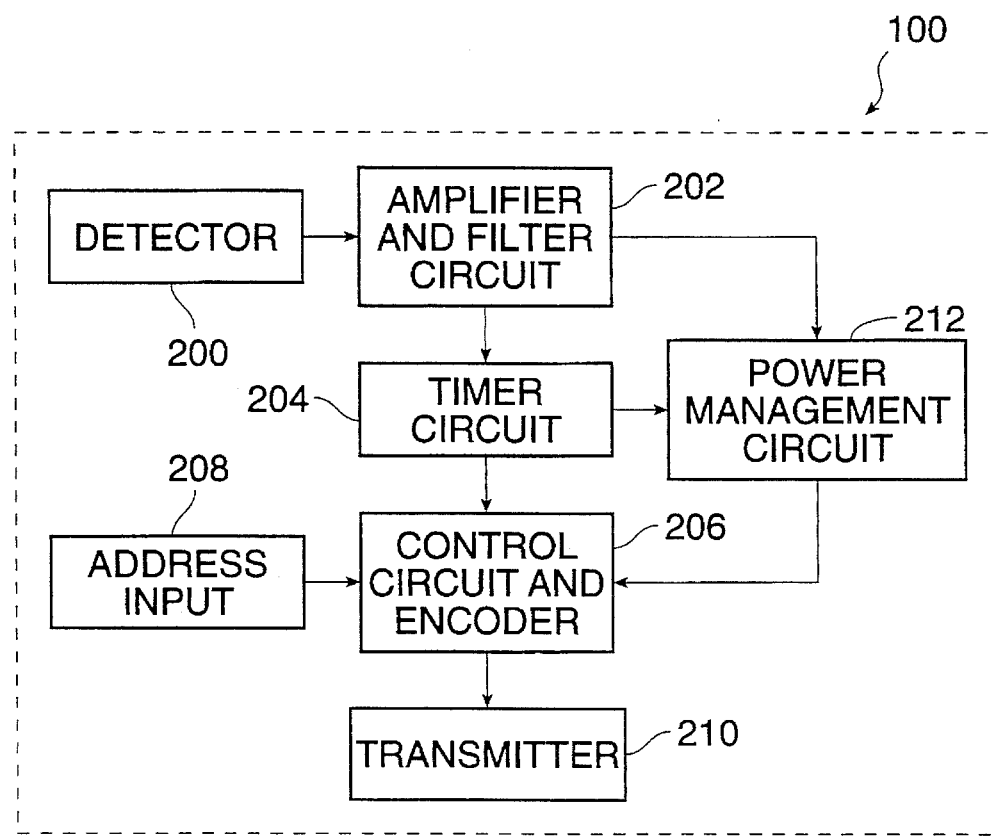
FIG. 2 is a block diagram of one embodiment of the portable sensing device of the sensor system shown in FIG. 1.

FIG. 2 is a block diagram of one embodiment of portable sensing device 100 shown in FIG. 1. The portable sensing device of FIG. 2 comprises a detector 200, an amplifier and filter circuit 202, a timer circuit 204, a control circuit and encoder 206, an address input unit 208, a transmitter 210, and a power management circuit 212.

Detector 200 can use any of a variety of means to detect the presence of a person in a room. For example, detector 200 can include an infrared detector that senses the body heat of anyone present in a room or an ultrasonic motion detector that detects movement in a room. Persons skilled in the art of sensors will recognize a variety of other means to implement detector 200. An infrared detector is preferred in one embodiment because it is a passive means of detecting a person, and thus requires less battery power than an ultrasonic motion detector, which must actively transmit ultrasonic waves to detect movement.

A detection signal is generated by detector 200, which is coupled at an output to an input of amplifier and filter circuit 202, when the presence of a person is detected. Amplifier and filter circuit 202 amplifies and filters the detection signal received from detector 200 to separate noise signals and more accurately allow sensing device 100 to detect a person.

Amplifier and filter circuit 202 is coupled to transmitter 210 through timer circuit 204 and control circuit and encoder 206. When a person is detected by detector 200, transmitter 210 transmits an asserted control signal directly, or uses it to modulate a carrier signal, to indicate to load control unit 102 that light 124 should be switched on.

Timing circuit 204 times the periods in which detector 200 does not detect the presence of a person. If light 124 is switched ON and a predetermined period of time expires without detector 200 detecting a person, timing circuit 204 communicates to transmitter 210 through encoder 206 that light 124 should be switched off. Transmitter 210 then transmits a deasserted control signal, indicating the absence of a person, to control unit 102. In other embodiments of the present invention, timing circuit 204 can perform more complicated timing functions, as well known in the art, see for instance, U.S. Pat. No. 4,571,399 assigned to Novitas, Inc. Additionally, one of skill in the art will recognize that all sorts of algorithms may be employed to predict when a person will be absent from an area for a substantial period of time.

Transmitter 210 can be either a radio frequency transmitter or an infrared transmitter. An infrared transmitter is preferred in one embodiment because infrared signals are less likely to travel outside of a room and interfere with the operation of other desktop sensors.

The circuitry associated with detecting the presence and absence of a person in an area is well known to those skilled in the art. One example that details how to implement both an ultrasonic detector and an infrared detector is U.S. Pat. No. 5,189,393 entitled "Dual Technology Motion Sensor" assigned to Applicants and incorporated by reference into this application for patent. In fact, it is possible for detector 200 to be a dual technology detector as described exactly in U.S. Pat. No. 5,189,393.

Address input unit 208 is a bank of DIP switches that allows a user to select an address for sensing device 100. Alternatively, the address can be pre-programmed or programmable by a maintenance unit, with address unit 208 being the internal memory holding the address. Each sensing device transmits an address signal with the control signal to allow multiple desktop sensors to be used in a single environment. Each sensor (mated sensing device and load control unit pair) can be programmed to respond to control signals with a specific address preventing the load control unit in one room from responding to stray signals from a portable sensing device located in another room or hallway. The address signal in one embodiment is 8-bits allowing one of 256 addresses to be chosen. Of course, any number of bits can be used to store the address of each sensing device and load control unit.

Address input unit 208 is coupled to control circuit and encoder 206. The address selected through address input unit 208 is encoded by control circuit and encoder 206 and transmitted along with the control signal by transmitter 210. Other means of allowing address selection are possible such as a single multi-position switch or a keypad input. In one embodiment, control circuit and encoder 206 is implemented by the HT600 Encoder chip manufactured by Holtek Microelectronics, Inc.

Power management circuit 212 is coupled to detector 200 through amplifier and filter circuit 202, timer circuit 204, and control circuit and encoder 206. Power management circuit 212 places timer circuit 204 and control circuit and encoder 206 of portable sensing device 100 in sleep mode to minimize current dissipation and conserve battery power. In operation, detector 200 is always active.

When timer circuit 204 detects that detector 200 has not detected the presence of a person for period of time (typically between 3–15 minutes), timer circuit 204 times-out and power management circuit 212 places portable sensing device 100 in sleep mode. Portable sensing device 100 remains in sleep mode until detector 200 detects the presence of a person. When a person is detected, timer circuit 204 and control circuit and encoder 206 are released from sleep mode.

In one embodiment of the present invention, power management circuit 212, control logic and encoder 206, and timer circuit 204 are all implemented through a microprocessor or microcontroller chip.

Figure 3:
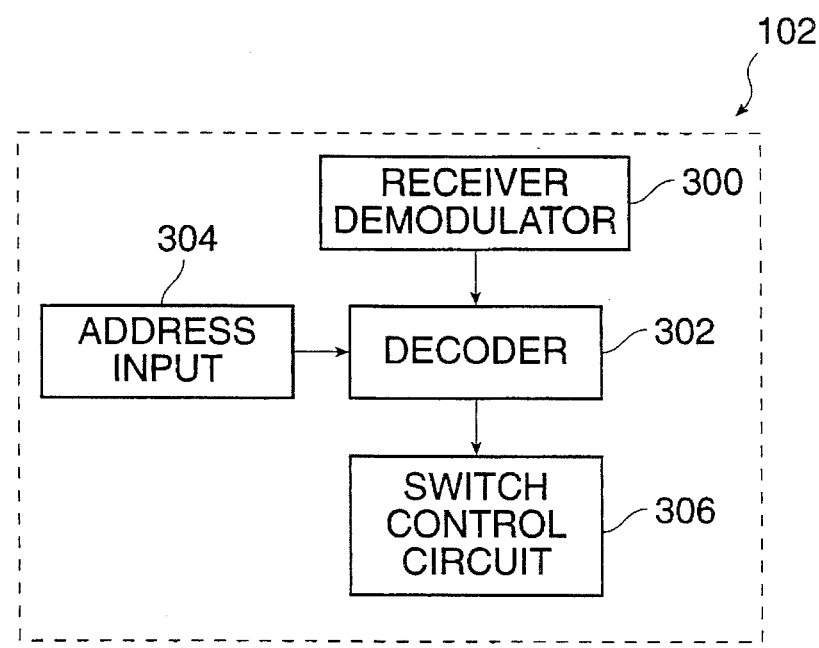
FIG. 3 is a block diagram of one embodiment of the load control unit of the sensor system shown in FIG. 1.

FIG. 3 is a block diagram of one embodiment of load control unit 102 shown in FIG. 1. Load control unit 102 of FIG. 3 comprises a receiver and demodulator 300, a decoder 302, an address input unit 304, and a switch control circuit 306.

Receiver and demodulator 300 receives and demodulates the address and control signals transmitted by transmitter 210 of sensing device 100. Receiver and demodulator 300 is of an appropriate type to communicate with transmitter 210. Thus, if transmitter 210 is a radio frequency transmitter, receiver and demodulator 300 is a radio frequency receiver. Whereas if transmitter 210 is an infrared signal transmitter, receiver and demodulator 300 is an infrared signal receiver and thus includes a photodetector.

Figure 4:
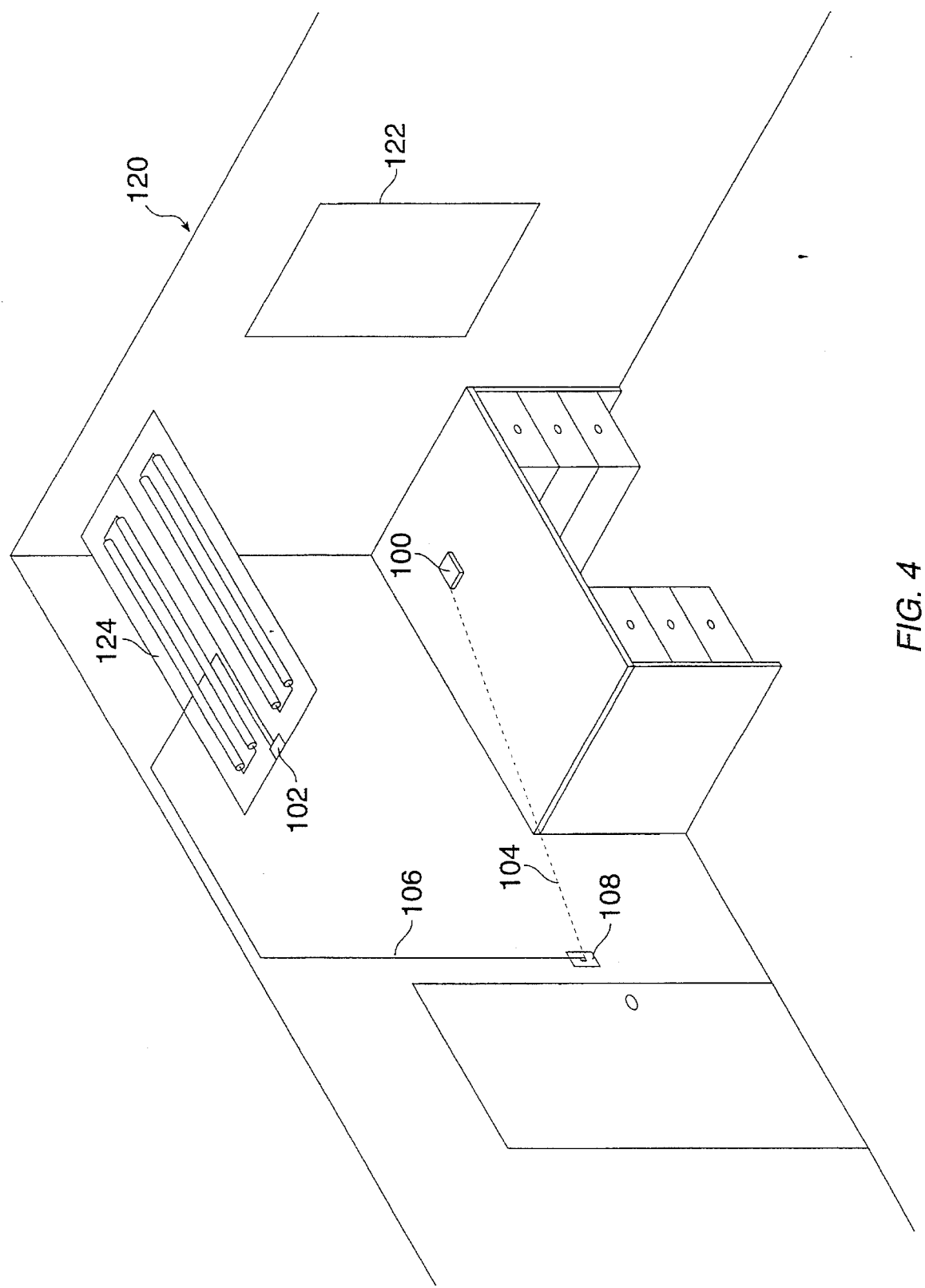
FIG. 4 is a perspective view of a desktop sensor that uses a fiber optic cable to carry signals transmitted from the portable sensing device of FIG. 2 to the load control unit of FIG. 3.

As shown in FIG. 4, when transmitter 210 is an infrared signal transmitter, it is possible to use a fiber optic cable 106 to carry the infrared signal transmitted from transmitter 210 of remote sensing unit 100 to receiver and demodulator 300 of load control unit 102. Fiber optic cable 106 is exposed at a point 108 in a suitable position to receive light signals transmitted by transmitter 210 such that the received light signals enter fiber optic cable 106 at an angle suitable for the signals to be transmitted through fiber optic cable 106. Using fiber optic cable 106 to transmit the infrared signal from transmitter 210 to receiver and demodulator 300 allows load control unit 102 to be situated so that it is completely hidden from visual sight, such as above a ceiling near light 124.

Receiver and demodulator 300 is coupled to decoder 302, which decodes the received address and control signals. Decoder 302 is coupled to address input unit 304, which allows a user to assign an address to receiver/load control unit 102. For proper operation, the address assigned to control unit 102 matches the address selected for remote sensing device 100, thus making the two components a mated pair. Address input unit 304 is a memory or a bank of DIP switches similar to address input unit 208. If the addresses match, switch control circuit 306 operates light 124 by switching it ON if the received control signal is asserted or switching it OFF if the received control signal is deasserted.

Figure 5:
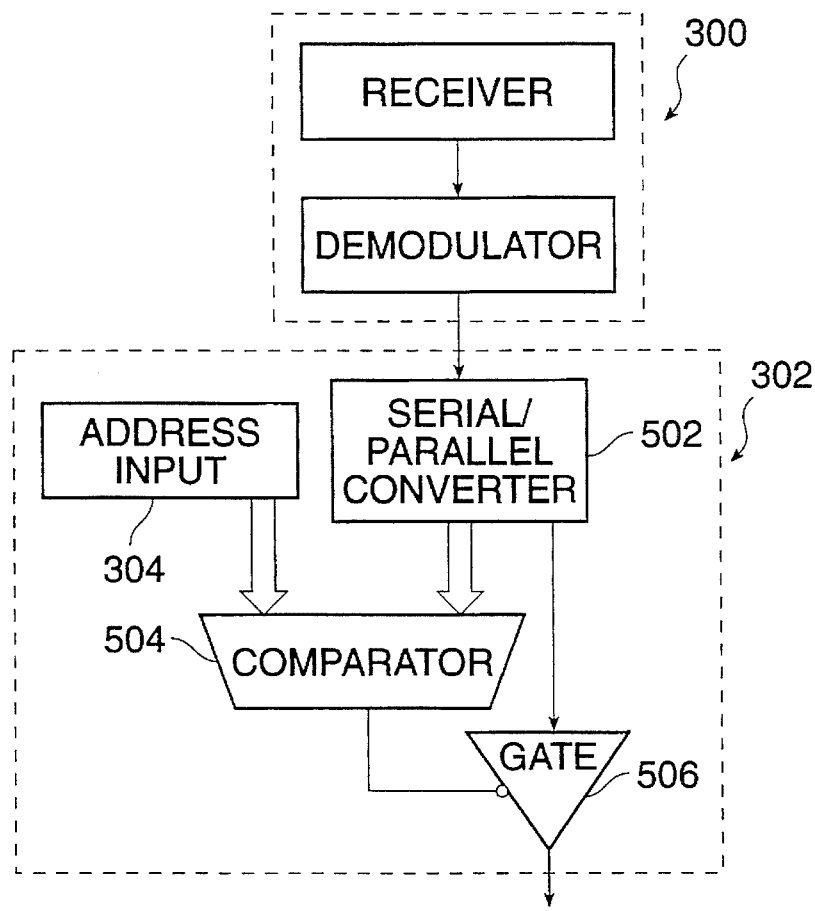
FIG. 5 is a block diagram of an embodiment of the decoder shown in FIG. 3.

FIG. 5 is a block diagram of one embodiment of decoder 302 shown in FIG. 3. Decoder 302 comprises a serial-to-parallel converter 502, a comparator 504, and a gate 506. Serial-to-parallel converter 502 receives the demodulated signal from receiver and demodulator 300 in serial format and converts it to a parallel digital signal. The parallel signal comprises an 8-bit address portion and a 1-bit control portion. Comparator 504 compares the address signal from address input unit 304 with the address signal from serial-to-parallel converter 502 and outputs a signal that controls gate 506. Gate 506 allows the control signal from serial to parallel converter 502 to go to switch control circuit 306 if the addresses input to comparator 504 match. Otherwise, gate 506 is closed and cannot send the control signal through to switch control circuit 306. In one embodiment, decoder 302 is implemented by the HT605 Decoder chip manufactured by Holtek Microelectronics, Inc.

II. Occupancy Detector with Ambient Light Control

Figure 8:
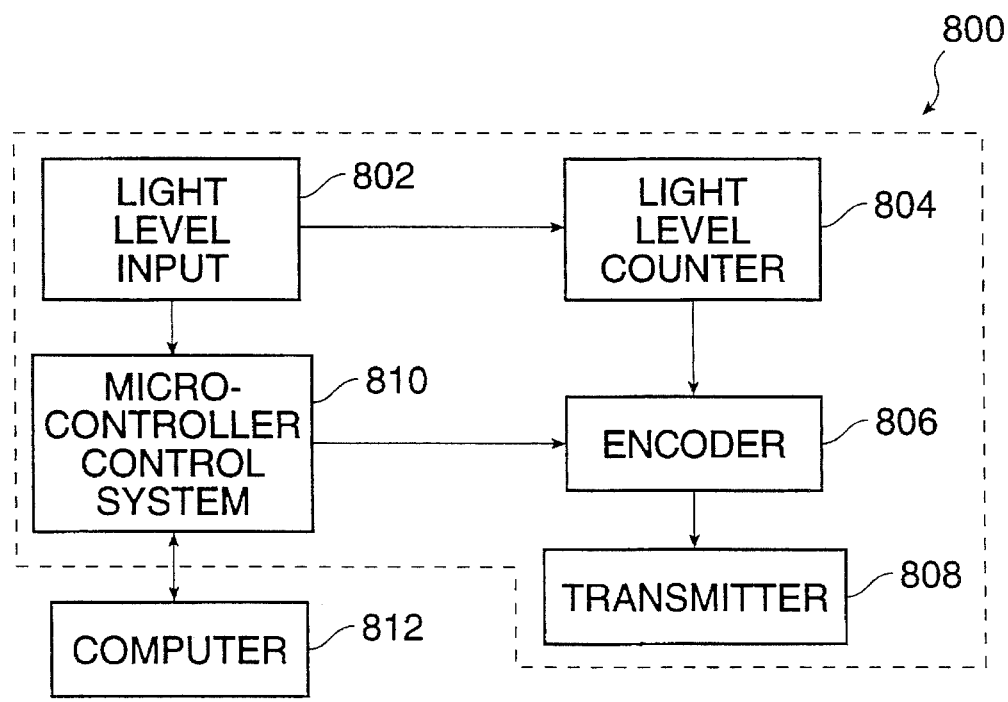
FIG. 8 is a block diagram of one embodiment of the maintenance unit for use with the sensor system illustrated in FIGS. 6–7.
Figure 6:
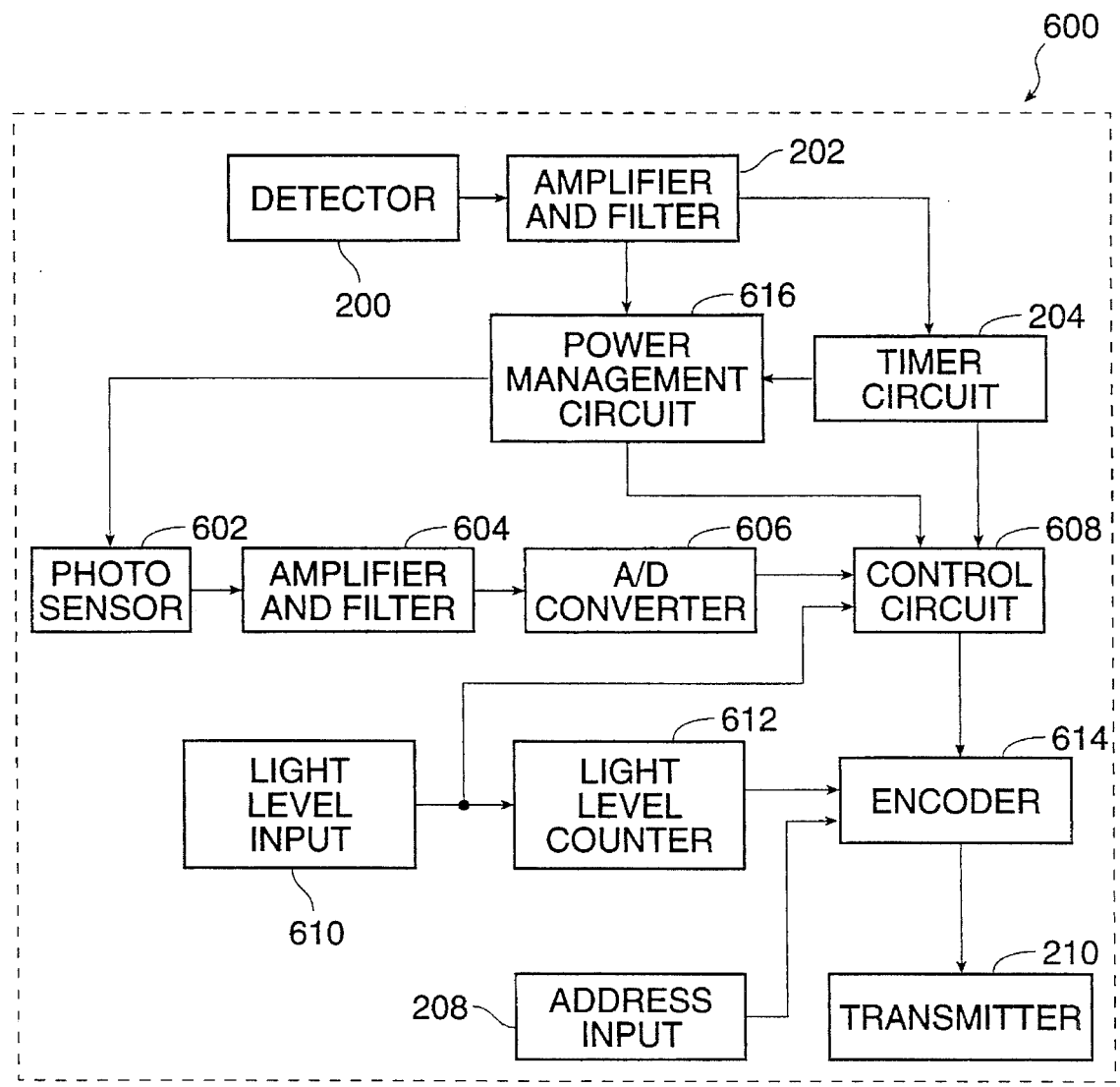
FIG. 6 is a block diagram of a second embodiment of the portable sensing device of the sensor system shown in FIG. 1.
Figure 7:
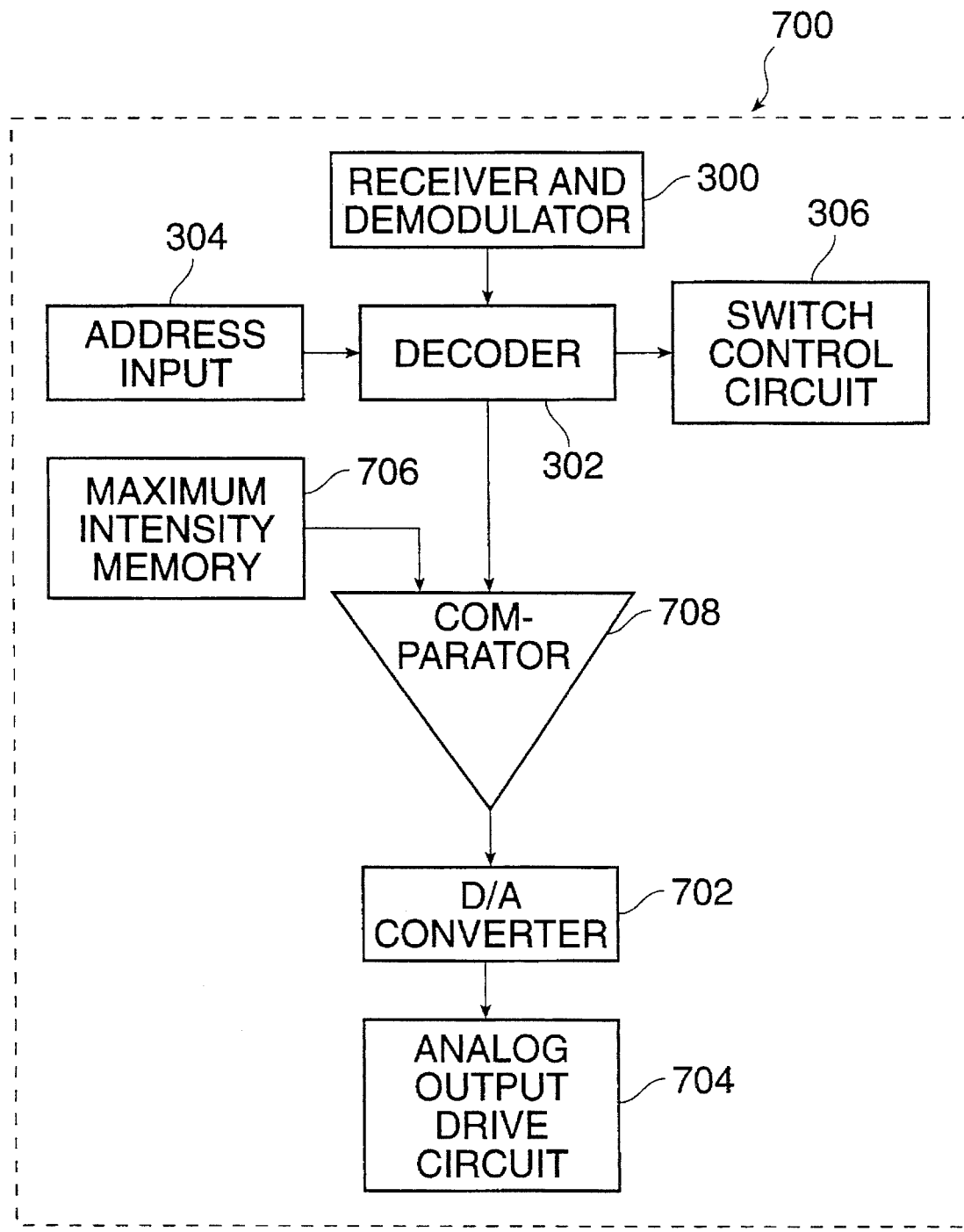
FIG. 7 is a block diagram of a second embodiment of the load control unit of the sensor system shown in FIG. 1.

FIGS. 6, 7, and 8 illustrate a second embodiment of the desktop sensor shown in FIG. 1. The sensor system of FIGS. 6–8 includes three components: a portable remote sensing device 600 (FIG. 6), a load control unit 700 (FIG. 7), and a maintenance unit 800 (FIG. 8). Sensing device 600 operates on battery power (or alternatively, AC power) to detect the presence of a person in room 120 and the level of ambient light entering room 120 through a window 122. Sensing device 600 processes the received information and communicates the processed information in the form of control signals to control unit 700 by a wireless transmission method.

Maintenance unit 800 is a hand-held unit that is used to transmit to control unit 700 a signal that sets a maximum brightness level at which a light controlled by control unit 700 can operate. Maintenance unit 800 allows a building administrator or other worker to set the maximum intensity level of lights connected to load control unit 700. Limiting the brightness level of lights in certain areas of a building, or throughout the entire building, to an intensity level below the maximum allows for savings in electricity and reduced energy costs.

FIG. 6 is a block diagram of one embodiment of remote sensing device 600. Remote sensing device 600 is similar in structure to sensing device 100, so for convenience, the same reference numerals used in FIG. 2 are used in FIG. 6 to refer to like elements of the sensing devices.

Remote sensing device 600 comprises a detector 200, an amplifier and filter circuit 202, a timer circuit 204, an address input unit 208, a transmitter 210, a photo sensor 602, an amplifier and filter circuit 604, an analog-to-digital converter 606, a control circuit 608, a light level input device 610, a light level counter 612, an encoder 614, and a power management circuit 616.

Sensing device 600 switches light 124 ON or OFF in response to detecting the presence or absence of a person and also adjusts the brightness of light 124 depending on the level of detected ambient light and a user's selected brightness level. Since sensing device 600 detects the presence of a person and is assigned an address in the same manner as remote sensing unit 100, only the light brightness adjusting features of remote sensing device 600 are described.

Photo sensor 602 senses the level of ambient light present at the location where sensing device 600 is situated and generates an analog ambient light level signal indicative of the sensed light level. Photo sensor 602 is coupled at an output to an input of amplifier and filter circuit 604, which amplifies and filters the ambient light level signal generated by photo sensor 602. Amplifier and filter circuit 604 is coupled at an output to an input of analog-to-digital converter 606. Analog-to-digital converter 606 converts the analog ambient light level signal to a digital signal that is used by control circuit 608 to set the brightness level of light 124.

Control circuit 608 is coupled at a first input to timer circuit 204, at a second input to analog-to-digital converter 606, and at a third input to light level input 610. Control circuit 608 compares the level of ambient light detected by photo sensor 602 with the user's selected light brightness level from light level input 610 and calculates whether the intensity of light 124 needs to be increased and by how much. If the brightness of light 124 needs to be increased to maintain the user's selected brightness level, control circuit 608 outputs an intensity level signal indicative of the requisite intensity level of light 124. The intensity level signal is a 4-bit digital signal that allows light 124 to be set at one of sixteen different intensity levels. Of course, other embodiments can vary the bit size of the intensity level signal to allow for the selection of more or fewer intensity levels.

Because the retina of the human eye is slow to adjust to light changes, one embodiment of the present invention does not use control circuit 608 to decrease the intensity of light 124 even if the level of detected ambient light increases. Decreasing the intensity of light 124 in these instances may be more of an annoyance to a person in the room than an energy saver. Other embodiments, however, freely adjust the intensity of light 124 in response to increases or decreases of ambient light detected by photo sensor 602. Additionally, in one other embodiment, only changes above a specified de minimis level are effected by control circuit 608.

Light level input device 610 can be a key pad input device that allows a user to select a desired brightness level for light 124 by pressing a first key to increase the light intensity level or a second key to decrease the light intensity level. Of course, those skilled in the art will recognize that many other input devices besides key pads, e.g., a potentiometer, can be used to enable a user to select a desired brightness level. In one embodiment, each time the first key is depressed by a user, the intensity level of light 124 is increased by a fixed intensity level, while each time the second key is depressed, the intensity level is decreased by the fixed intensity level. Accordingly, pressing the first key down three times (or holding it down for a certain period of time) increases the brightness of light 124 by 3 intensity levels.

Light level input device 610 is coupled at an output to an input of light level counter 612. Light level counter 612 acts as a memory and tracks the desired brightness level selected by the user. Thus, each time the user presses the first key to increase the brightness of light 124, counter 612 is incremented by one. Each time the second key is depressed to decrease the brightness of light 124, counter 612 is decremented by one count. An output of light level counter 612 is coupled to encoder 614.

Encoder 614, coupled at an output to an input of transmitter 210, encodes the control signal, address signal, and intensity signal into a single digital signal for transmission by transmitter 210. Transmitter 210 transmits the digital signal directly, or uses it to modulate a carrier signal, so that it can be received by load control unit 700.

Power management circuit 616 is almost identical to power management circuit 212 except that it places timer circuit 204, control circuit 608, encoder 614, and photo sensor 602 in sleep mode when timer circuit 204 times-out. Additionally, because the light measured from photo sensor 602 does not need to be constantly sampled, when portable sensing device 600 is not in sleep mode, power management circuit 616 ensures that photo sensor 602 is activated for only a small percentage of time as compared to the rest of the circuitry on portable sensing device 600. For example, in one embodiment, power management circuit 616 activates photo sensor 602 for 5 seconds every 5 minutes.

FIG. 7 is a block diagram of one embodiment of load control unit 700. Load control unit 700 is similar in structure to load control unit 102 thus, for convenience, the same reference numerals used in FIG. 2 are used in FIG. 7 to refer to like elements of the control units.

Load control unit 700 comprises receiver and demodulator 300, decoder 302, address input unit 304, switch control circuit 306, a digital-to-analog converter 702, an analog output drive circuit 704, a maximum intensity level memory 706, and a comparator 708.

Load control unit 700 receives the address, control, and intensity level signals transmitted by transmitter 210 of sensing device 600 and turns light 124 on or off or adjusts its intensity accordingly. The manner in which light 124 is turned ON and OFF and the manner in which the address of a received signal is verified is the same as described with load control unit 102. Thus, only the operation of adjusting the brightness of light 124 is described here.

The intensity level signal is received by receiver and demodulator 300 along with the control and address signals. After being demodulated by receiver and demodulator 300, the intensity signal is converted into a 4-bit parallel signal by serial-to-parallel converter 502, which is part of decoder 302. The intensity level signal is then sent to a first input of comparator 708 which has a second input coupled to an output of maximum intensity memory 706. Maximum intensity memory 706 holds the 4-bit maximum intensity level at which light 124 operates and is set by maintenance unit 800. In another embodiment, the maximum intensity level at which light 124 operates may be set through a switch unit, such as DIP switches, coupled to maximum intensity memory 706. Comparator 708 compares the intensity level signal with the maximum set intensity level and outputs the lower of the two signals. Thus, comparator 708 ensures that light 124 is not set above the maximum level set by maintenance unit 800.

The output of comparator 708 is coupled to an input of digital-to-analog converter 702 which converts the signal output from comparator 708 to an analog signal used to set the brightness or intensity level of light 124.

In one embodiment of the present invention, light 124 is a fluorescent lamp that is plugged into a dimmable ballast such as the Mark 7 Fluorescent Lamp Ballast manufactured by Advance Transformer Company. The Mark 7 ballast accepts a DC input voltage of between 1 and 10 volts to adjust the brightness of a fluorescent lamp. When the DC input voltage is 1 volt, the lamp is at its dimmest output, and when the DC input voltage is 10 volts, the lamp is brightest. Other companies manufacture similar ballasts that operate on identical or similar principles as the Mark 7. It should be obvious to one skilled in the art that analog output drive circuit 704 can be employed to drive lights connected to these ballasts also. Additionally, the present invention can be used to adjust the intensity of a light by means other than outputting a DC voltage. A great variety of light dimmers are on the market, and the present invention can be adapted to work with any of them.

Analog output drive circuit 704 generates an output that is appropriate to adjust the brightness of light 124 depending on the ballast used with light 124. Thus, when the Mark 7 ballast is used, a DC voltage of between 1 and 10 volts is output from analog output drive circuit 704.

FIG. 8 is a block diagram of one embodiment of the maintenance unit portion of the desktop sensor system illustrated in FIGS. 6–8. Maintenance unit 800 comprises a light level input unit 802, a light level counter 804, an encoder 806, and a transmitter 808.

Light level input unit 802 is used to set the maximum intensity level at which light 124 can be operated. Light level input unit 802 can comprise a first and a second key and operate in the same manner as key pad input unit 410, or light level input unit 802 can comprise a potentiometer or other input device as would be apparent to one skilled in the art. Additionally, light level counter 804 works in a manner identical to light level counter 612 to track the selected maximum brightness level.

Encoder 806 encodes the selected maximum brightness level and an address signal generated by microcontroller control system 810 into a signal transmitted by transmitter 808. The transmitted maximum brightness level signal is individually matched with each of the 256 possible addresses and transmitted 256 times, once at each address to load control unit 700. The transmission time for all 256 addresses is less than a couple of seconds, and this method ensures that an individual load control unit will receive the maximum brightness level regardless of its assigned address. Persons skilled in the art will readily recognize that other methods of ensuring address compatibility between the maintenance unit and each load control unit are possible, for example, each load control unit can be designed to respond to two known addresses: a master address sent by the maintenance unit and selectable address set to match the load control unit to its mated portable sensing device.

The signal transmitted be transmitter 808 is received at load control unit 700 by receiver and demodulator 300.

Maintenance controller 800 also includes a microcontroller control system 810 that allows it to interface with a computer 812 which can be part of an energy management system that maximizes efficient energy use in offices. Microcontroller control system 810 can communicate with computer 812 through an RS-232 or similar interface. Computer 812 can be programmed with the address information of all load control units in a building. Thus, computer system 812 can be programmed to set different maximum intensity levels for each load control unit in a building depending on the load control unit's location. For instance, all the load control units on the south side of a building which receives less sunlight on the north side, can be programmed to a maximum intensity level three levels below the maximum intensity level of load control units on the north side. Computer 812 can then download the address of each load control unit and the maximum intensity level it is programmed to microcontroller control system 810 which stores the information in a memory. An office worker can take hand-held maintenance unit 800 throughout a building and use it to transmit each downloaded address signal and maximum intensity level signal pair to every installed load control unit or selected load control units. Each individual load control unit sent a signal from maintenance unit 800 will then respond only to its correct address and set its maximum intensity level accordingly.

Having fully described two embodiments of the present invention, many other equivalent or alternative methods of implementing the desktop sensor will be apparent to those skilled in the art. For example, the load operated by the desktop sensor can be switched OFF by an asserted signal and on by a deasserted signal; the load can be switched ON or OFF upon receipt of a valid address signal as long as the load control unit remembers or can ascertain whether the load was previously ON or OFF. These equivalents and alternatives are intended to be included within the scope of the present invention.

What is claimed is:

1. An apparatus for controlling power to a light, said apparatus comprising:

(a) a remote sensing device, including:
      i) detecting means for detecting the presence of a person;
      ii) timing means, coupled to said detecting means, for timing periods when no person is detected by said detecting means;
      iii) signal generating means, coupled to said detecting means and to said timing means, for generating a control signal indicating the presence of a person or the absence of a person for a predetermined time period;
      iv) address selecting means for selecting an address signal to be transmitted with said control signal; and
      v) photo sensing means for sensing the level of ambient light in a room;
      vi) intensity calculating means, coupled to said photo sensing means, for calculating a particular light output intensity level based on the sensed ambient light level and generating an intensity signal indicating said particular output light intensity level; and
      vii) transmitting means, coupled to said signal generating means and to said address setting means, for transmitting a wireless transmission of said control signal, said address signal, and said intensity signal; and (b) a control unit, separate from said remote sensing device, including:
      i) signal receiving means for receiving said wireless transmission of said control signal, said address signals, and said intensity signal;
      ii) address assigning means for assigning an address to said control unit;
      iii) address comparing means, coupled to said address assigning means and to said signal receiving means, for comparing said assigned address to said received address signal;
      iv) power switching means, coupled to said signal receiving means, for switching power to said light in response to said control signal when said received address signal matches said assigned address; and
      v) brightness adjusting means, coupled to said signal receiving means and to said light, for adjusting the brightness level of said light in response to said intensity signal when said received address signal matches said assigned address; and wherein said remote sensing device further comprises brightness selecting means, coupled to said signal generating means, for enabling a user to select a particular brightness level to which said brightness adjusting means will adjust said light to.

2. The apparatus of claim 1 wherein said brightness selecting means comprises a key pad input device.

3. The apparatus of claim 2 wherein said key pad input device comprises at least a first and a second key, said first key for enabling said user to select incrementally increasing brightness levels of said light and said second key for allowing said user to select incrementally decreasing brightness levels of said light.

4. The apparatus of claim 2 wherein said brightness selecting means further comprises a light level counter coupled to said key pad input device.

5. The apparatus of claim 1 further comprising a first amplifier circuit coupled at an input to said detecting means and at an output to said timing means and a second amplifier circuit coupled at an input to said photo sensor and at an output to said intensity calculating means.

6. The apparatus of claim 5 further comprising a first filter circuit coupled at an input to said output of said first amplifier circuit and at an output to said timing means, and a second filter circuit coupled at an input to said output of said second amplifier circuit and at an output to said intensity calculating means.

7. The apparatus of claim 6 wherein said detecting means comprises an infrared detector.

8. The apparatus of claim 6 wherein said motion detecting means comprises an ultrasonic motion detector comprising an ultrasonic transmitter and an ultrasonic receiver.

9. The apparatus of claim 7 or 8 wherein said transmitting means comprises an infrared signal transmitter.

10. The apparatus of claim 9 wherein said signal receiving means comprises a fiber optic cable.

11. The apparatus of claim 7 or 8 wherein said transmitting means comprises a radio frequency signal transmitter.

12. An apparatus for controlling power to a light, said apparatus comprising:
(a) a remote sensing device, including:
- i) detecting means for detecting the presence of a person;
- ii) timing means, coupled to said detecting means, for timing periods when no person is detected by said detecting means;
- iii) signal generating means, coupled to said detecting means and to said timing means, for generating a control signal indicating the presence of a person or the absence of a person for a predetermined time period;
- iv) address selecting means for selecting an address signal to be transmitted with said control signal; and
- v) photo sensing means for sensing the level of ambient light in a room;
- vi) intensity calculating means, coupled to said photo sensing means, for calculating a particular light output intensity level based on the sensed ambient light level and generating an intensity signal indicating said particular output light intensity level; and
- vii) transmitting means, coupled to said signal generating means and to said address setting means for transmitting a wireless transmission of said control signal, said address signal, and said intensity signal; and (b) a control unit, separate from said remote sensing device, including:
- i) signal receiving means for receiving said wireless transmission of said control signal, said address signals, and said intensity signal;
- ii) address assigning means for assigning an address to said control unit;
- iii) address comparing means, coupled to said address assigning means and to said signal receiving means, for comparing said assigned address to said received address signal;
- iv) power switching means, coupled to said signal receiving means, for switching power to said light in response to said control signal when said received address signal matches said assigned address; and
- v) brightness adjusting means, coupled to said signal receiving means and to said light, for adjusting the brightness level of said light in response to said intensity signal when said received address signal matches said assigned address; and wherein said remote sensing device further comprises power management means, coupled to said photo sensing means, for controlling when said photo sensing means senses the level of ambient light in the room.

13. An apparatus for controlling power to a light, said apparatus comprising:
(a) a remote sensing device, including:
- i) detecting means for detecting the presence of a person;
- ii) timing means, coupled to said detecting means, for timing periods when no person is detected by said detecting means;
- iii) signal generating means, coupled to said detecting means and to said timing means, for generating a control signal indicating the presence of a person or the absence of a person for a predetermined time period;
- iv) address selecting means for selecting an address signal to be transmitted with said control signal; and
- v) photo sensing means for sensing the level of ambient light in a room;
- vi) intensity calculating means, coupled to said photo sensing means, for calculating a particular light output intensity level based on the sensed ambient light level and generating an intensity signal indicating said particular output light intensity level; and
- vii) transmitting means, coupled to said signal generating means and to said address setting means, for transmitting a wireless transmission of said control signal, said address signal, and said intensity signal; and (b) a control unit, separate from said remote sensing device, including:
- i) signal receiving means for receiving said wireless transmission of said control signal, said address signals, and said intensity signal;
- ii) address assigning means for assigning an address to said control unit;
- iii) address comparing means, coupled to said address assigning means and to said signal receiving means, for comparing said assigned address to said received address signal;
- iv) power switching means, coupled to said signal receiving means, for switching power to said light in response to said control signal when said received address signal matches said assigned address; and
- v) brightness adjusting means, coupled to said signal receiving means and to said light, for adjusting the brightness level of said light in response to said intensity signal when said received address signal matches said assigned address; and wherein said remote sensing device further comprises power management means, coupled to said detecting means, to said photo sensing means, and to said timing means, for controlling when said photo sensing means senses the level of ambient light in the room and for controlling when said timing means times periods when no person is detected by said detecting means in response to signals generated by said detecting means and said timing means.

14. The apparatus of claim 1 further comprising a maintenance controller, said maintenance controller comprising:
- i) maximum brightness selecting means for selecting a maximum brightness level to which said light can be adjusted; and
- ii) transmitting means for transmitting a wireless transmission of a second control signal indicating the selected maximum brightness level;

wherein said brightness adjusting means adjusts the brightness of said light in response to said first control signal only up to said selected maximum brightness level.

15. The apparatus of claim 14 wherein said maintenance controller is a hand-held unit.

16. The apparatus of claim 14 wherein said maintenance controller further comprises interface means for interfacing to and exchanging data with a computer system.

17. A portable desktop apparatus for controlling power to a lighting unit, said portable desktop apparatus comprising:
(a) detecting means for detecting whether an area is occupied;

(b) brightness selecting means for enabling a user to select a particular brightness level of said lighting unit;

(c) signal generating means, coupled to said detecting means and to said brightness selecting means, for generating a control signal in response to said detecting means indicating whether said area is occupied and for generating an intensity signal in response to said brightness selecting means indicating said selected brightness level; and (d) transmitting means, coupled to said signal generating means, for transmitting a wireless transmission of said control signal and said intensity signal from said detecting means.

18. The apparatus of claim 17 wherein said brightness selecting means comprises a key pad input device.

19. The apparatus of claim 18 wherein said key pad input device comprises at least a first and a second key, said first key for enabling said user to select incrementally increasing brightness levels of said light and said second key for allowing said user to select incrementally decreasing brightness levels of said light.

20. The apparatus of claim 18 wherein said brightness selecting means further comprises a light level counter coupled to said key pad input device.

21. The apparatus of claim 17 wherein said detecting means comprises an infrared detector.

22. The apparatus of claim 17 wherein said detecting means comprises an ultrasonic motion detector comprising an ultrasonic transmitter and an ultrasonic receiver.

23. The apparatus of claim 17 wherein said transmitting means comprises an infrared signal transmitter.

24. The apparatus of claim 17 wherein said transmitting means comprises a radio frequency signal transmitter.

25. The apparatus of claim 17 further comprising:

(e) address selecting means, coupled to said signal generating means, for selecting an address signal to be transmitted with said control signal; and (f) encoding means, coupled to said selecting means and to said signal generating means and contained in said first housing, for encoding said address signal before transmission.

26. A system for controlling power to a lighting unit including the portable remote desktop apparatus set forth in claim 17 and further comprising a light control unit, coupled to said lighting unit, said light control unit including:

(c) signal receiving means for receiving said wireless transmission of said control signal and said intensity signal;

(d) brightness adjusting means, coupled to said signal receiving means and responsive to said wireless transmission of said intensity signal, for adjusting the brightness level of said light in response to said intensity signal; and (e) power switching means, coupled to said signal receiving means and responsive to said wireless transmission of said control signal, for switching power to said lighting unit.

27. A portable desktop apparatus for controlling power to a lighting unit, said portable desktop apparatus comprising:

(a) brightness selecting means for enabling a user to select a particular brightness level of said lighting unit;

(b) signal generating means, coupled to said brightness selecting means, for generating an intensity signal in response to said brightness selecting means indicating said selected brightness level; and (c) transmitting means, coupled to said signal generating means, for transmitting a wireless transmission of said intensity signal from said detecting means.

28. A system for controlling power to a lighting unit including the portable remote desktop apparatus set forth in claim 27 and further comprising a light control unit, coupled to said lighting unit, said light control unit including:

(d) signal receiving means for receiving said wireless transmission of said intensity signal; and (e) brightness adjusting means, coupled to said signal receiving means and responsive to said wireless transmission of said intensity signal, for adjusting the brightness level of said light in response to said intensity signal.

29. An apparatus for controlling power to an electric load, comprising:

(a) a portable remote sensing unit including:

(i) motion detecting means for detecting motion in an area;

(ii) timing means, coupled to said motion detecting means, for generating a time-out signal when said detecting means does not detect motion in said area for a predetermined duration;

(iii) signal generating means, coupled to said detecting means and to said timing means for generating a first control signal when said motion detecting means detects motion in said area and for generating a second control signal when said timing means generates said first time-out signal;

(iv) transmitting means, coupled to said signal generating means, for transmitting a wireless transmission of said first and second control signals; and (v) power management means, coupled to said timing means, for shutting said timing means OFF in response to said time-out signal; and (b) a load control unit, coupled to said electric load, said load control unit including:

(i) signal receiving means for receiving said wireless transmission of said first and second control signals; and (ii) power switching means, coupled to said signal receiving means, for switching said electric load ON in response to said first control signal and for switching said electric load OFF in response to said second control signal.

30. The apparatus set forth in claim 29 wherein said power management means is further coupled to said motion detecting means and wherein said power management means switches said timing means back ON when said motion detecting means detects motion.

31. The apparatus set forth in claim 29, or 30 wherein said power management means comprises a microcontroller.

32. A method of controlling a lighting source comprising the steps of:

(a) detecting motion in an area or room with a portable motion detecting unit;

(b) allowing a user to set a brightness level of the lighting source with a brightness selection control on said portable motion detecting unit;

(c) generating a control signal when motion is detected in said area or room and an intensity signal indicating a particular brightness level selected with said brightness selection control circuit with said portable motion detecting unit;

(d) transmitting a wireless transmission of said control signal and said intensity signal from said portable motion detecting device;

(e) receiving said wireless transmission of said control signal and said intensity signal with a light control unit coupled to the lighting source;

(f) switching the lighting unit ON with said lighting control unit when said control signal is received; and (g) adjusting the brightness of the lighting source with said lighting control unit in response to said intensity signal.

\* \* \* \* \*